United States Patent [19]

Robinson

[11] 3,999,878

[45] Dec. 28, 1976

[54] CONNECTOR MEANS FOR FURNITURE COMPONENTS

[75] Inventor: George Henry Robinson, Liverpool, England

[73] Assignee: Hygena Limited, Liverpool, England

[22] Filed: Aug. 13, 1975

[21] Appl. No.: 604,125

[30] Foreign Application Priority Data

Aug. 21, 1974 United Kingdom .............. 36671/74

[52] U.S. Cl. ................................ 403/407; 403/331
[51] Int. Cl.² ...................... B25G 3/00; F16D 1/00; F16G 11/00
[58] Field of Search .......... 403/407, 187, 188, 189, 403/287, 331, 335, 336, 384, 403, 404; 52/753 C, 753 D, 753 F, 758 F

[56] References Cited

UNITED STATES PATENTS

| | | | |
|---|---|---|---|
| 2,114,508 | 4/1938 | Steiner | 52/753 C |
| 2,792,263 | 5/1957 | Nalczyty | 403/189 |

FOREIGN PATENTS OR APPLICATIONS 981,291  5/1961  United Kingdom ............ 52/753 C Primary Examiner—Wayne L. Shedd
Attorney, Agent, or Firm—Ulle C. Linton

[57] ABSTRACT

The invention provides an improved means for connecting the components of demountable furniture, commonly referred to as 'knock-down' furniture, and provides a connector which comprises two elements each securable by screws to a component of an article of furniture and connectable to each other by a bolt, characterized in that one element has a flange which in use conceals the fastening screws of the other element, said other element conceals the fastening screws of the said one element, and the bolt connecting said elements is concealed by a push fit closure insertable in a countersink of the bore of said second element through which the bolt passes. In a preferred form said elements also are provided with interfitting parts which accurately align said elements in connectable position.

5 Claims, 16 Drawing Figures

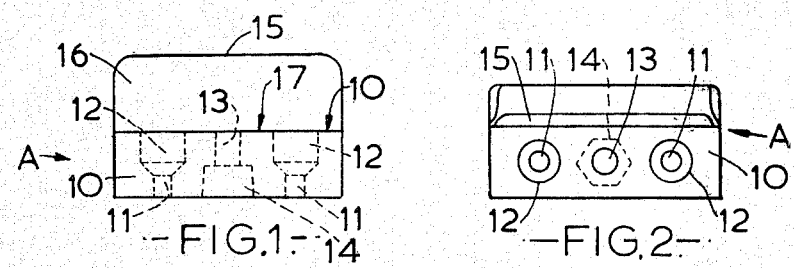
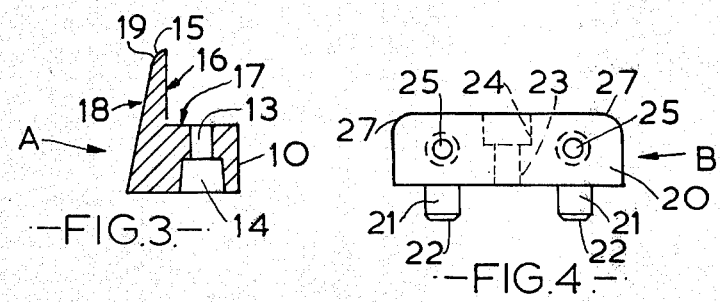
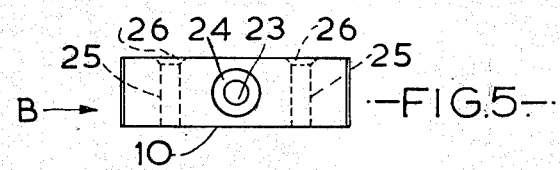
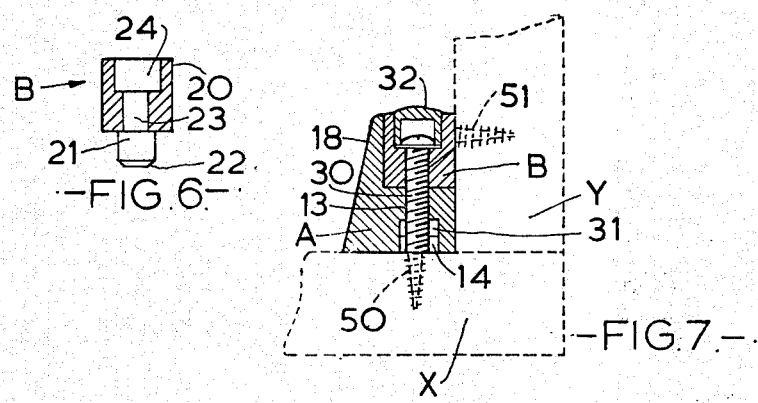

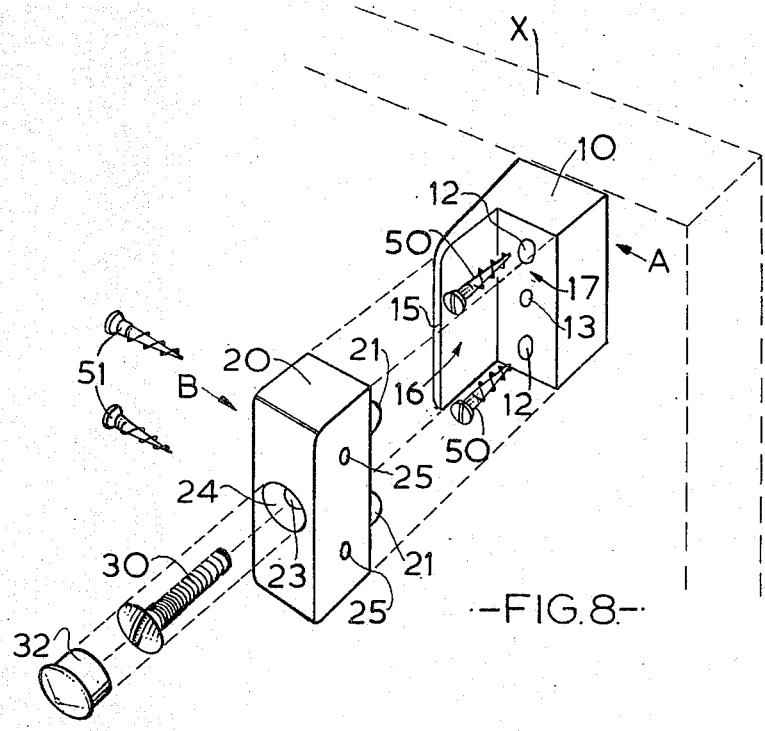
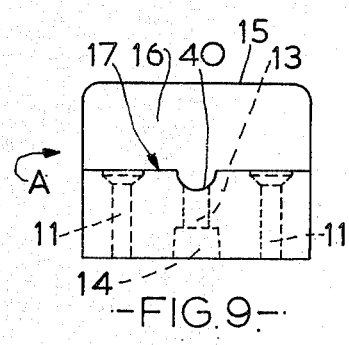
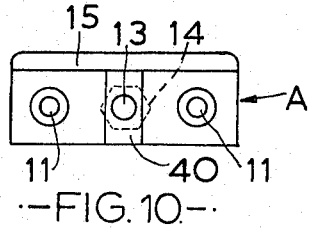
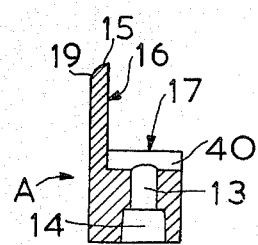

CONNECTOR MEANS FOR FURNITURE COMPONENTS

This invention relates to connector means for the components of demountable furniture, sometimes referred to as 'knock-down' furniture, and has for its object to provide an improved connector.

Connectors as conventionally employed usually comprise two connectable parts each of which is individually attached by wood screws to a furniture component. While relatively effective in connecting the furniture components, conventional connectors suffer from a disadvantage in that the heads of the screws attaching same in position, as also the screw or bolt connecting the connector parts, or at least some of same, are left exposed and constitute traps for dust and dirt. This is a particularly undersirable feature, both with respect to hygene and aesthetic appearance, in kitchen furniture.

The present invention has for its object an improved connector for the components of demountable furniture, particularly kitchen furniture, which will obviate the above and other disadvantages of conventional connectors.

Broadly, according to said invention, and in one mode of embodiment, a connector for the purpose specified comprises two elements each securable to a component of an article of furniture and connectable one to the other by a bolt and nut, characterised in that one of said elements comprises a generally parallelepipedic base having two countersunk screwholes, a bore extending parallel with said screw-holes for the reception of the connecting bolt, said latter bore being reversely countersunk to receive the nut component of said bolt, and a side flange lying in a plane parallel with said screw-holes and bore; and in that the other of said elements, comprises a generally parallelepipedic block dimensioned so as to be a snug fit in the angle defined by the base of the first mentioned elements and its flange, and being formed with a through countersunk bore alignable with the bolt receiving bore of the first mentioned element and two countersunk screw-holes extending at right angles to said through countersunk bore. The countersunk bore may be provided with a push fit closure. Preferably, said second mentioned element is provided with two spigot portions extending parallel with the countersunk bore, and the screwholes of the first element are countersunk to a depth which provides sockets for said spigot portions.

In use, the heads of the screws attaching the second element to a furniture component are concealed by the flange of the first element, and the screws of the first element are concealed by the second element which overlies same. The head of the connecting bolt is concealed by the cap closure provided for fitting in the provided countersink which preferably is parallel sided to ensure a tight friction fit for said cap.

The invention also comprehends an article of demountable furniture the component parts whereof or some of same are connectable by connectors as above described.

The invention is further described with the aid of the accompanying explanatory drawings which illustrate by way of example only two embodiments.

In said drawings:

FIGS. 1, 2 and 3 are respectively a side elevation, plan view and sectional end elevation of one element of a connector according to the invention, and FIGS. 4, 5 and 6 are similar views of the other co-operating element.

FIG. 7 is a sectional elevation of the two elements in use connecting together furniture components.

FIG. 8 is a perspective view of the two connector elements in position for being engaged one with the other.

FIGS. 9, 10 and 11 are respectively a side elevation, a plan view and a sectional end elevation of one element of an alternative form of connector.

Figure 12:
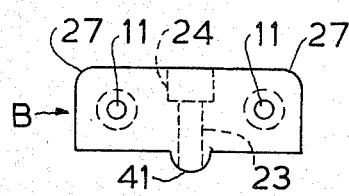
FIGS. 12, 13 and 14 are similar views of the other co-operating element.

Referring first to FIGS. 1-8, the connector illustrated comprises two elements A and B, each of which may be composed as a moulding or casting from a suitable synthetic resin, for example a rigid polypropylene, or a suitable metal or metal alloy.

The element A comprises a base block 10 which is formed with two, uniformly spaced, screw-holes 11 each of which is countersunk to a substantial depth thereby to provide sockets 12. Between said screw-holes 11 is a bore 13 for the reception of a bolt as hereinafter explained, said bore 13 reversely countersunk to provide a hexagonal recess 14 for a nut component which co-operates with said referred to bolt.

Extending from one side of the said base block 10, is a flange 15 the inner face 16 (FIG. 3) whereof is normal to the top face 17 of the base 10.

The right angle defined by the faces 16 and 17 of the element A is arranged so as to receive as a snug fit (FIG. 7) the element B. The latter is a generally parallelepipedic block 20 corresponding in length, breadth and height with said surfaces 16 and 17 of the element A. Said block 10 is formed on its underside with two spigot projections 21 arranged and dimensioned so as to be a close fit within the sockets 12 of the element A. Said spigot projections 20 are chamfered as at 22 to facilitate their engagement with the sockets 12.

Between and parallel with axis of said spigots 21 there is provided a bore 23 formed with a cylindrical counterbore 24. Extending through said block 20, one each side of the bore 23, are two screw-holes 25 formed with countersinks 26.

In use, and to connect furniture components as X and Y in FIG. 7, the element A is firmly attached to the component X by screws as 50 (FIG. 8) driven thereinto through the screw-holes 11. The element B is secured to the component Y by screws 51 driven thereinto through the screw-holes 25.

The two elements are then engaged in accurately aligned positions by entering the spigot projections 21 of element B into the sockets 12 of the element A (as illustrated in FIG. 8) and bolt 30 is passed through the aligned bores 13 and 23. Said bolt 30 is engaged with a nut component 31 non-rotatably located in the recess 14 of element A, and when tightened securely connects the two elements A and B, and thus components X and Y, firmly together.

It will be seen that screws attaching the element A to the component X are concealed by the element B, and that screws connecting the element B to the component Y are concealed by the flange 15 of the element A. Further, to conceal the head of the bolt 30 there is provided a closure cap 32 which is arranged and dimensioned so as to be a tight friction fit within the counterbore 24, as shown most clearly in FIG. 7. In order to provide an aesthetically pleasing appearance the outer surface 18 of the element A is inclined and the upper edge of the flange 15 is rounded or chamfered as at 19. Also, the outer edges 27 of the element B may be rounded as shown.

Figure 13:
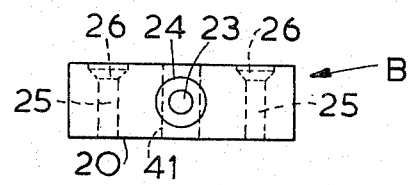
Figure 14:
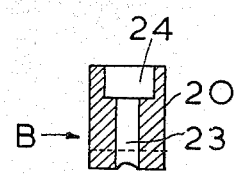
Figure 15:
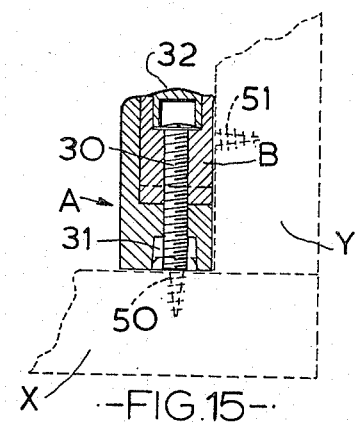
FIG. 15 is a sectional elevation of the two elements of FIGS. 9-14 in position of use connecting together two furniture components.
Figure 16:
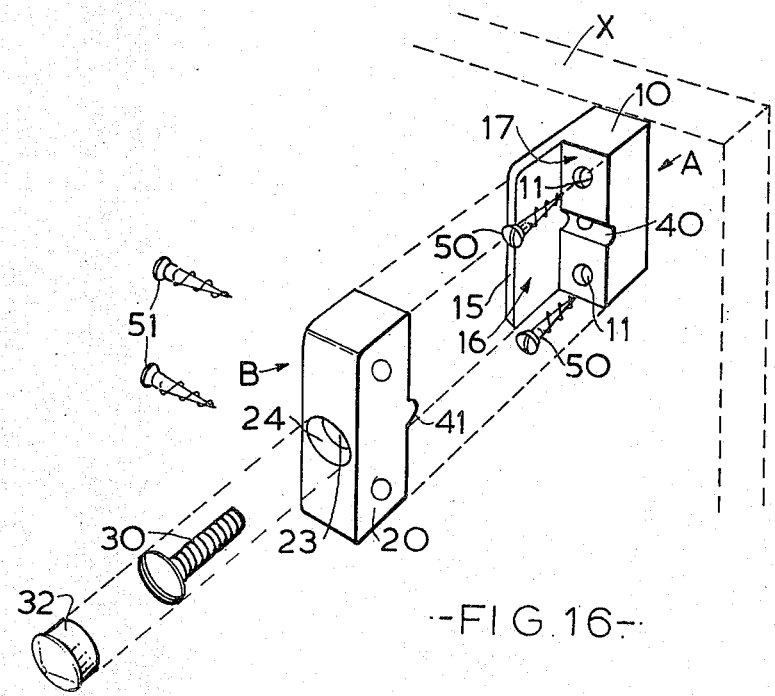
FIG. 16 is a perspective view of the two elements of FIG. 15 in position for being engaged one with the other.

Referring now to FIGS. 9–16, in which like characters of reference have been used to denote parts which are like or equivalent to those depicted in FIGS. 1–8, the connector illustrated differs only from the connector described in FIGS. 1–8 in that the spigot projections 21 of element B are omitted as also the corresponding sockets 12 of the element A. In place of these is provided in the upper surface 17 of the base block 10 of element A a transverse groove or channel 40, and for co-operating with said channel 40 there is a corresponding transverse ridge 41 provided on the underside of the element B. Said groove or channel 40 and ridge 41 are preferably substantially semi-circular in cross-sectional shape.

The elements A and B of the connector of FIGS. 9–16 function in the same way, more or less, as the elements A and B of FIGS. 1–8, and have the same characteristic features in that the screwing bolt and screws are not visible in use.

What I claim as my invention and desire to secure by Letters Patent is:

1. A connector for connecting two components of an article of furniture, comprising a bolt, two co-operating elements each securable to a component of an article of furniture and connectable one to the other by said bolt, one of said elements having a generally parallelepipedic base with two countersunk screw-holes and a bore extending parallel with said screw-holes with said bolt therein, said element having a countersink and a reverse countersink at said bore, a nut component for said bolt being positioned in said reverse countersink, a push fit closure being positioned in said first countersink, said element having a side flange lying in a plane parallel with said screw-holes and said bore; and the other of said elements having a generally parallelepipedic block of a size for snuggedly fitting in the angle defined by a face of said first element base and its flange, said block being formed with a through countersunk born alignable with said bolt-receiving bore of said first element and two countersunk screw-holes extending at right angles to said through countersunk bore.

2. A connector as claimed in claim 1, wherein the screw-holes of said first element are countersunk providing sockets and said second element has spigot portions capable of mating with said sockets.

3. A connector as claimed in claim 1, wherein there is provided in one of said elements a transverse groove and on the other of said elements a co-operating transverse ridge for mating with said groove.

4. A connector as claimed in claim 1, wherein said elements are composed of a synthetic resin.

5. A connector as claimed in claim 1, wherein said elements are composed of a metallic material.

* * * * *